(12) United States Patent
Park

(10) Patent No.: US 9,366,316 B2
(45) Date of Patent: Jun. 14, 2016

(54) ROTATION ASSEMBLY AND SURVEILLANCE APPARATUS INCLUDING THE ROTATION ASSEMBLY

(71) Applicant: HANWHA TECHWIN CO., LTD., Changwon-Si (KR)

(72) Inventor: Won-Myung Park, Seongnam-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 602 days.

(21) Appl. No.: 13/746,405

(22) Filed: Jan. 22, 2013

(65) Prior Publication Data
US 2013/0271599 A1    Oct. 17, 2013

(30) Foreign Application Priority Data

Apr. 16, 2012  (KR) .................. 10-2012-0039283

(51) Int. Cl.
| F16H 1/06 | (2006.01) |
| G01D 11/30 | (2006.01) |
| G08B 13/196 | (2006.01) |
| G01D 5/244 | (2006.01) |

(52) U.S. Cl.
CPC ............... *F16H 1/06* (2013.01); *G01D 11/30* (2013.01); *G01D 5/244* (2013.01); *G08B 13/1963* (2013.01); *Y10T 74/19647* (2015.01)

(58) Field of Classification Search
CPC ........................................................ F16H 1/06
USPC ........................................................ 348/143
See application file for complete search history.

(56) References Cited

U.S. PATENT DOCUMENTS 6,414,713 B1 *  7/2002  Ebisawa et al. ............... 348/131
6,684,706 B2 *  2/2004  Knight et al. .................... 73/623

FOREIGN PATENT DOCUMENTS

KR  10-2006-0116301 A   11/2006
KR  10-2007-0090552 A    9/2007

* cited by examiner

*Primary Examiner* — Paulos M Natnael
*Assistant Examiner* — Justin Sanders
(74) *Attorney, Agent, or Firm* — Sughrue Mion, PLLC

(57) ABSTRACT

Provided a rotation assembly including: a base unit; a rotation frame unit rotatably installed on the base unit; a rotation driving unit which drives the rotation unit to rotate; an encoder including a hollow axis installed on the base unit and an encoder main body installed on the rotation frame unit; and a slip ring installed on the base unit, wherein a portion of the slip ring or a portion of a cable connected to the slip ring is disposed in a through hole provided in the hollow axis.

16 Claims, 5 Drawing Sheets

ROTATION ASSEMBLY AND SURVEILLANCE APPARATUS INCLUDING THE ROTATION ASSEMBLY

CROSS-REFERENCE TO RELATED PATENT APPLICATION

This application claims priority from Korean Patent Application No. 10-2012-0039283, filed on Apr. 16, 2012, in the Korean Intellectual Property Office, the disclosure of which is incorporated herein by reference in its entirety.

BACKGROUND

1. Field

Apparatuses consistent with exemplary embodiments relate to a rotation assembly and a surveillance apparatus including the rotation assembly.

2. Description of the Related Art

Various surveillance apparatuses are operated for watching key facilities or specific regions.

In the related art, a surveillance apparatus includes a camera for taking pictures of an object to be watched, where the surveillance apparatus also includes a rotation assembly that rotates the camera. The rotation assembly enables the camera to improve the performance of taking pictures.

Korean Patent Publication No. 2007-0090552 discloses such a surveillance robot system having an active camera that can pan and tilt.

SUMMARY

One or more exemplary embodiments provide a rotation assembly that can correctly measure a rotation movement of a rotation frame and a surveillance apparatus including the rotation assembly.

According to an aspect of an exemplary embodiment, there is provided a rotation assembly including: a base unit; a rotation frame unit rotatably installed on the base unit; a rotation driving unit which drives the rotation frame unit to rotate; an encoder including a hollow axis installed on the base unit and an encoder main body installed on the rotation frame unit; and a slip ring installed on the base unit, wherein a portion of the slip ring or a portion of a cable connected to the slip ring is disposed in a through hole provided in the hollow axis.

The base unit may include a main gear fixedly installed on the base unit, and the rotation driving unit may be installed on the rotation frame unit and include a driving gear engaging with the main gear.

The base unit may further include a terminal unit electrically connected to an external circuit, and the terminal unit may be electrically connected to an input unit of the slip ring.

The rotation frame unit may include a control substrate, and the control substrate may be electrically connected to an output unit of the slip ring.

The rotation driving unit may include a rotation motor that rotates a driving gear in the rotating driving unit.

A central axis of the hollow axis may coincide with a rotation axis of the rotation frame unit.

The rotation frame unit may be configured to rotate if a driving gear thereof revolves around a main gear included in the base unit.

The rotation frame unit may rotate with respect to the rotation axis in an equal rotation with a rotation of the driving gear around the main gear.

The hollow axis may be fixedly installed on the base unit and the encoder main body may be fixedly installed on the rotation frame unit.

The encoder main body may rotate around the hollow axis with respect to a central axis of the hollow axis.

The encoder main body may be fixedly installed on the rotation frame unit so that the rotation frame unit rotates along with the encoder main body when the rotation frame unit is driven by the rotation driving unit.

A surveillance apparatus may include: the rotation assembly and an imaging apparatus installed on the rotation frame unit.

The base unit comprises a main gear fixedly installed on the base unit, and the rotation driving unit may be installed on the rotation frame unit and includes a driving gear engaging with the main gear.

The base unit may further include a terminal unit electrically connected to an external circuit, and the terminal unit may be electrically connected to an input unit of the slip ring.

The rotation frame unit may include the control substrate, and the control substrate may be electrically connected to an output of the slip ring.

The rotation driving unit may include a rotation motor that rotates a driving gear in the rotating driving unit.

A central axis of the hollow axis may coincide with a rotation axis of the rotation frame unit.

The rotation frame unit is configured to rotate if a driving gear thereof revolves around a main gear included in the base unit.

The rotation frame unit rotates with respect to the rotation axis in an equal rotation amount with a rotation of the driving gear around the main gear.

The hollow axis is fixedly installed on the base unit and the encoder main body is fixedly installed on the rotation frame unit.

BRIEF DESCRIPTION OF THE DRAWINGS

The above and other aspects will become more apparent by describing in detail exemplary embodiments thereof with reference to the attached drawings in which.

DETAILED DESCRIPTION

Figure 1:
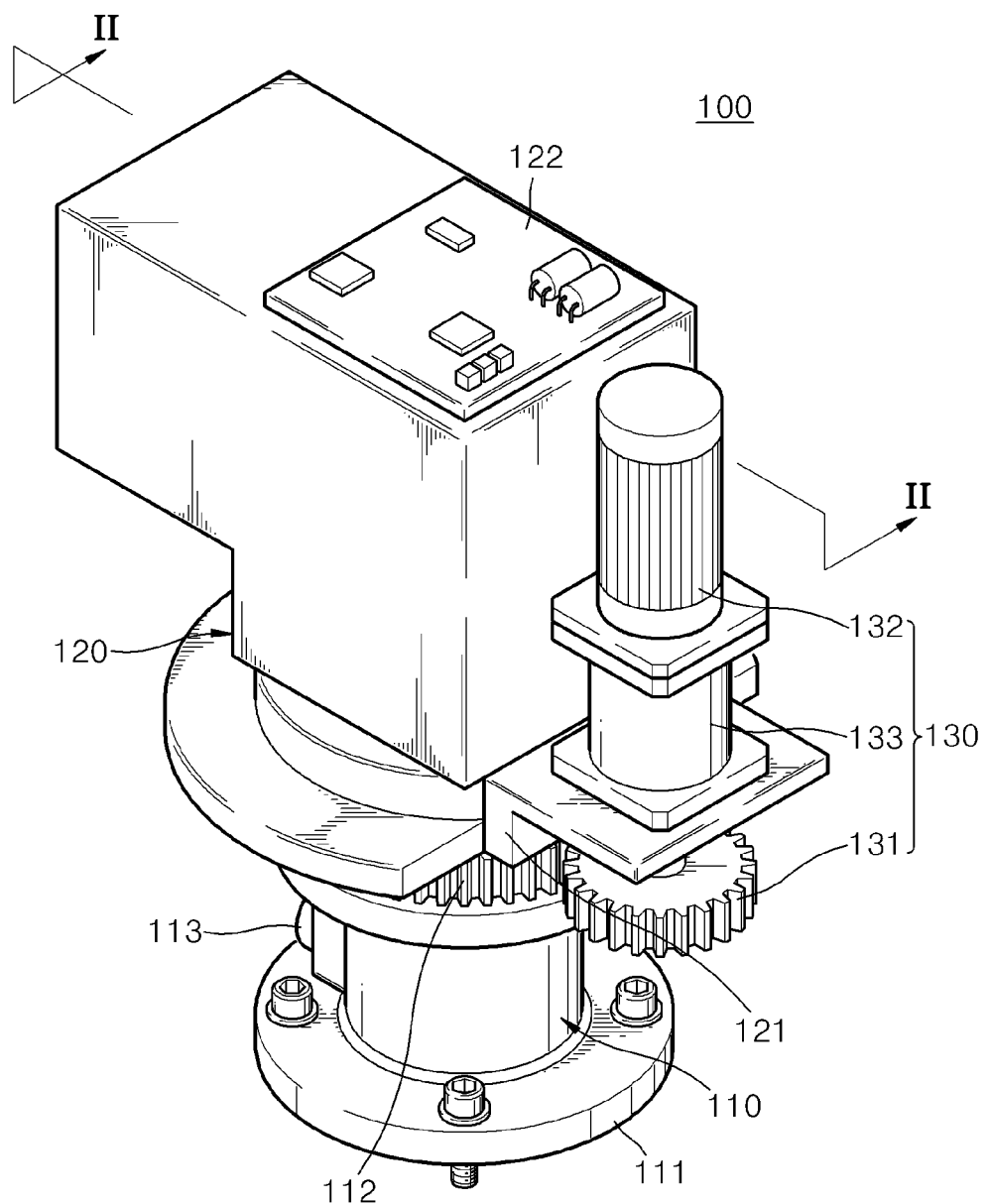
FIG. 1 is a schematic perspective view of a rotation assembly including a rotation frame according to an exemplary embodiment.

The exemplary embodiments will be described more fully with reference to the accompanying drawings. Like reference numerals in the specification and drawings denote like elements, and thus their repetitive description will be omitted.

Figure 2:
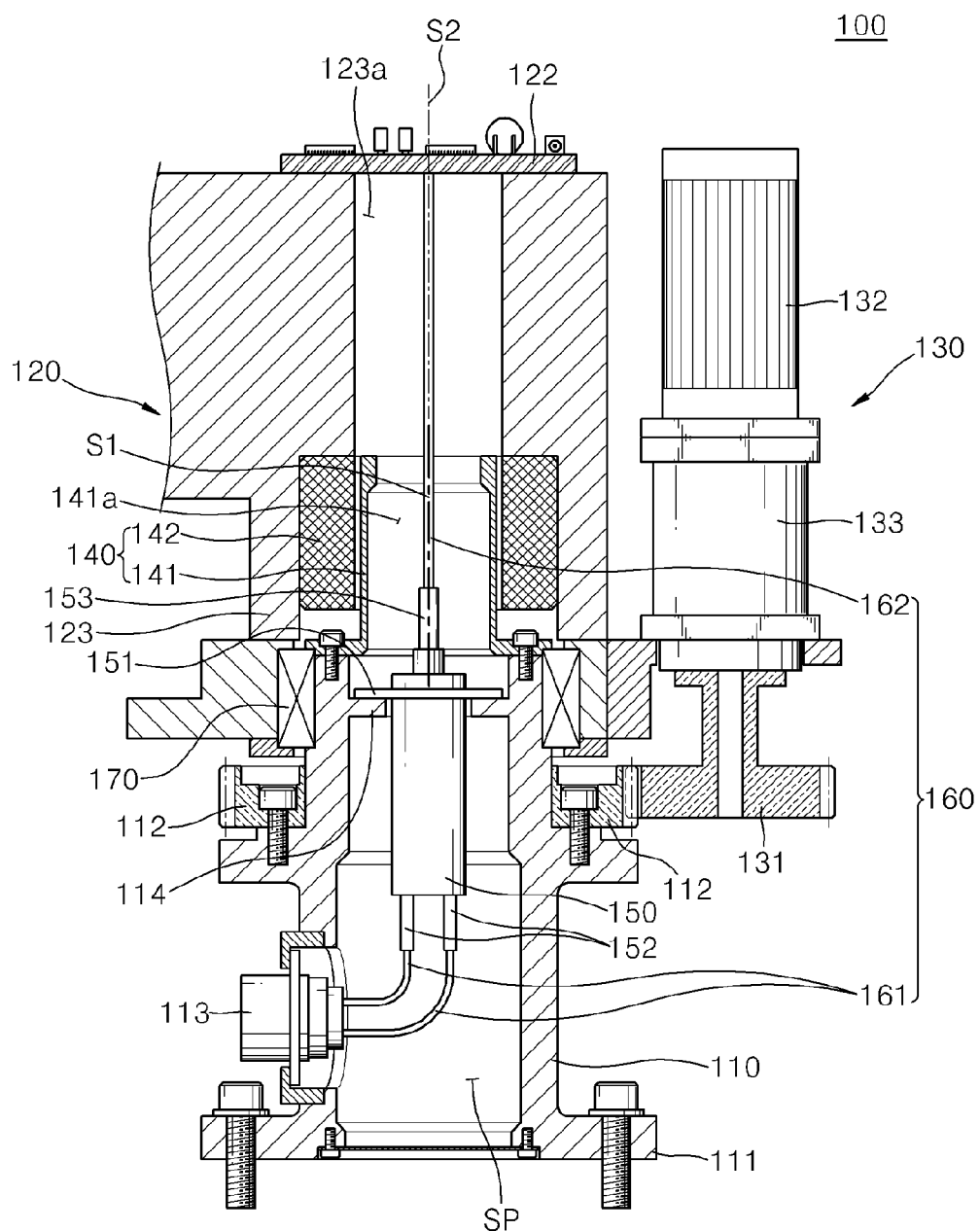
FIG. 2 is a schematic cross-sectional view taken along line II-II of the rotation assembly of FIG. 1.
Figure 3:
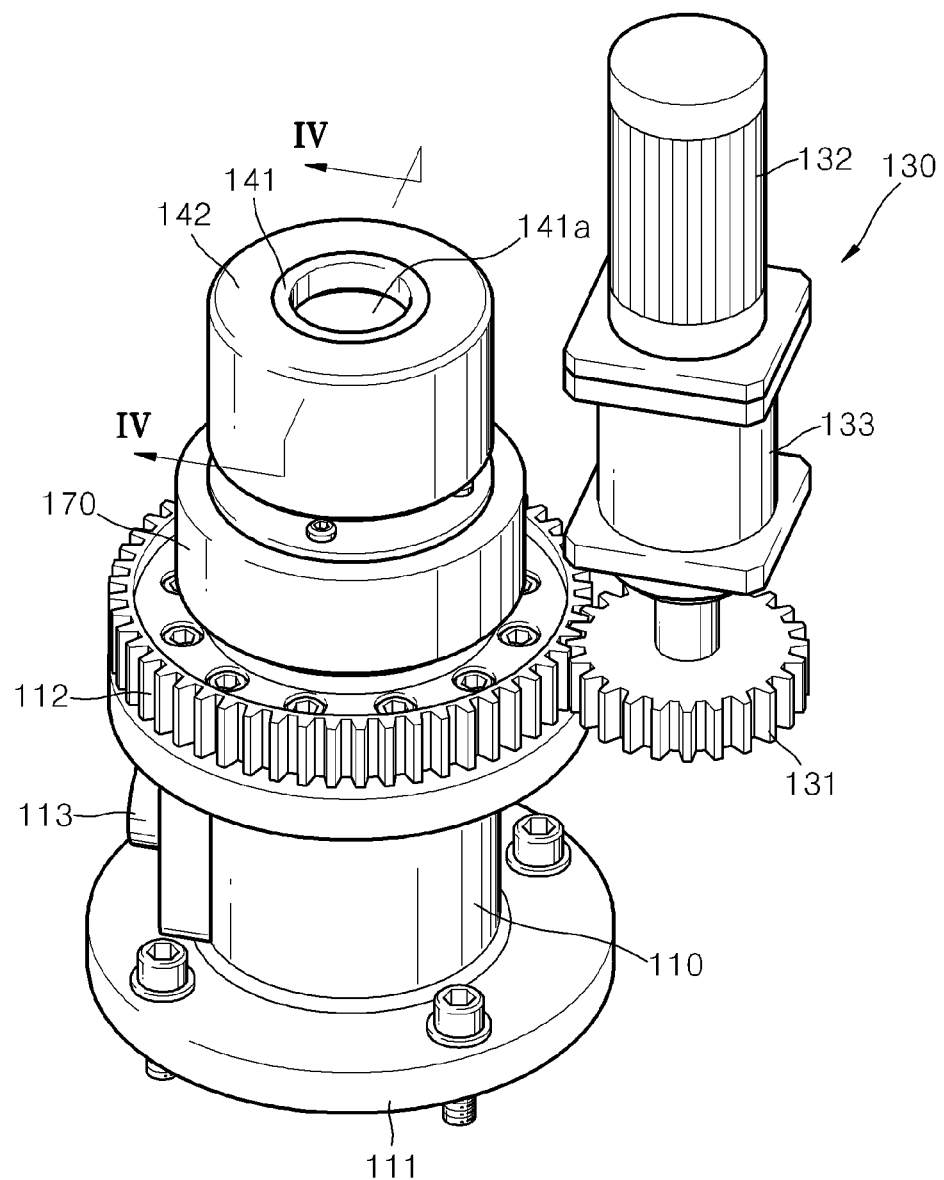
FIG. 3 is a schematic perspective view of the rotation assembly of FIG. 1 without the rotation frame unit.
Figure 4:
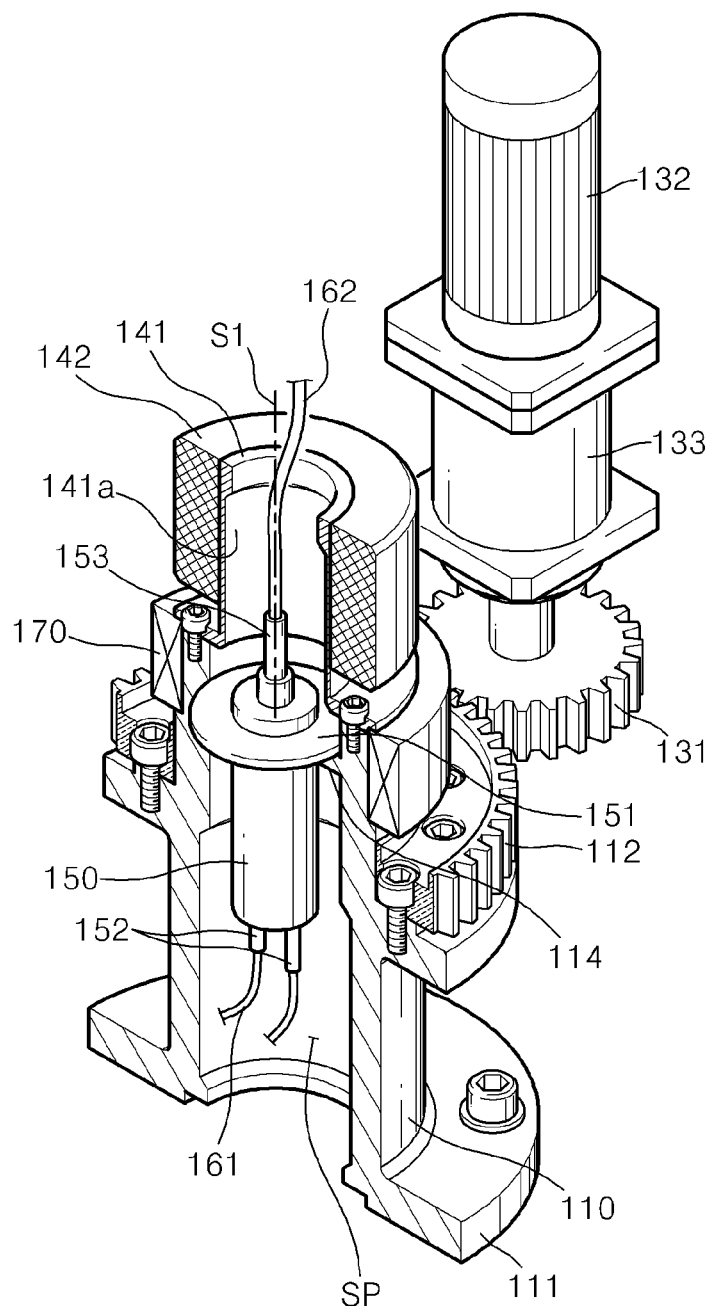
FIG. 4 is a cut away perspective view taken along line IV-IV of the rotation assembly of FIG. 3.

FIG. 1 is a schematic perspective view of a rotation assembly 100 according to an exemplary embodiment. FIG. 2 is a schematic cross-sectional view taken along line II-II of the rotation assembly 100 of FIG. 1. FIG. 3 is a schematic perspective view of the rotation assembly 100 without a rotation frame unit 120. FIG. 4 is a cut away perspective view taken along line IV-IV of the rotation assembly 100 of FIG. 3.

Referring to FIGS. 1 through 4, the rotation assembly 100 includes a base unit 110, the rotation frame unit 120, a rotation driving unit 130, an encoder 140, a slip ring 150, a cable 160, and a bearing 170.

The base unit 110 supports the rotation assembly 100.

The base unit 110 includes a supporting unit 111 thereunder. The supporting unit 111 may be mounted on a building, a base supporter, or the ground.

A main gear 112 is fixedly installed on an outside the base unit 110. The main gear 112 includes a ring gear having a ring shape and is engaged with a driving gear 131 described below.

A terminal unit 113 is installed on a side of the base unit 110. The terminal unit 113 is electrically connected to an external circuit such as a signal circuit or a power source circuit located outside the base unit 110 and has a connector shape.

An internal space SP for installing the slip ring 150 is formed within the base unit 110. A slip ring supporting unit 114 for supporting the slip ring 150 is formed on an inner surface of the base unit 110.

The rotation frame unit 120 is rotatably installed on the base unit 110. To do so, the bearing 170 is installed between the rotation frame unit 120 and the base unit 110.

A rotation driving unit installation unit 121 for installing the rotation driving unit 130 is formed on a side of the rotation frame unit 120.

A control substrate 122 is installed on the rotation frame unit 120. The control substrate 122 computes a rotation angle or a rotation angular speed in response to a signal from the encoder 140 or controls a rotation motor 132 of the rotation driving unit 130.

An encoder installation unit 123 for installing the encoder 140 is formed on a lower inner side of the rotation frame unit 120. A connection path 123a through which the cable 160 may pass is formed on an inner side of the encoder installation unit 123.

The rotation driving unit 130 is fixedly installed on the rotation driving unit installation unit 121 of the rotation frame unit 120.

The rotation driving unit 130 includes the driving gear 131, the rotation motor 132, and a speed reducing device 133.

The driving gear 131 is engaged with the main gear 112.

The rotation motor 132 generates a power for rotating the driving gear 131, and is driven by receiving electricity and control signal from the control substrate 122. The rotation motor 132 may be a servo-motor, a direct current motor, etc.

The speed reducing device 133 receives power from the rotation motor 132, and changes a rotation speed to transmit the power to the driving gear 131. The speed reducing device 133 may be a prevalent speed reducing device including a train of gears, a friction wheel, and a belt power train.

According to the current exemplary embodiment, the rotation driving unit 130 includes the speed reducing device 133. However, the exemplary embodiment is not limited thereto, and the rotation driving unit 130 may not include the speed reducing device 133, and in this case, the driving gear 131 is directly connected to an axis of the rotation motor 132.

The encoder 140 measures the rotation movement of the rotation frame unit 120. The encoder 140 includes a hollow axis 141 and an encoder main body 142.

The encoder 140 may be an optical type encoder, a resistance type encoder, or a magnetic type encoder. The type of the encoder 140 is not specifically limited, and may be any type that can measure the rotation movement of the rotation frame unit 120.

The hollow axis 141 has a through hole 141a in the center thereof. An edge of the hollow axis 141 is fixedly installed on the base unit 110.

The encoder main body 142 is fixedly installed on the encoder installation unit 123 and is electrically connected to the control substrate 122.

According to the rotation of the rotation frame unit 120, the hollow axis 141 and the encoder main body 142 are moved relative to each other. When the hollow axis 141 and the encoder main body 142 are relatively moved, a signal for measuring the rotation movement is generated by a structure disposed in the encoder 140. The signal is transmitted to the control substrate 122, which computes a rotation angle, a rotation angular speed, a rotation angular acceleration speed, etc. to use a feedback control of the rotation motor 132.

The central axis S1 of the hollow axis 141 is installed to coincide with the rotation axis S2 of the rotation frame unit 120.

The slip ring 150 is a part that rotates without twisting the cable 160 although the rotation frame unit 120 rotates.

The slip ring 150 is installed in the inner space SP of the base unit 110. The slip ring supporting unit 114 that supports the slip ring 150 is formed on the inner surface of the base unit 110. The slip ring 150 includes a slip ring mounting unit 151, which is mounted on the slip ring supporting unit 114.

The slip ring 150 includes an input unit 152 on a lower side of the slip ring 150 and an output unit 153 on an upper side of the slip ring 150. The input unit 152 and the output unit 153 have structures to have a relative movement, and thus, prevent the cable 160 from twisting.

The input unit 152 is electrically connected to the terminal unit 113 of the base unit 110, and the output unit 153 is electrically connected to the control substrate 122.

An upper edge of the slip ring 150 is disposed in the hollow axis 141 of the encoder 140, that is, in the through hole 141a.

According to the current exemplary embodiment, the upper edge of the slip ring 150 is disposed in the hollow axis 141 of the encoder 140, that is, in the through hole 141a, but the exemplary embodiment is not limited thereto. That is, only the cable 160 connected to the slip ring 150 may be disposed in the through hole 141a.

The cable 160 includes a first cable portion 161 and a second cable portion 162.

The first cable portion 161 is disposed in the inner space SP of the base unit 110, and electrically connects the terminal unit 113 and the input unit 152 of the slip ring 150.

The second cable portion 162 electrically connects the output unit 153 of the slip ring 150 and the control substrate 122. To do so, the second cable portion 162 is connected to the control substrate 122 through the through hole 141a and the connection path 123a.

The bearing 170 is installed between the base unit 110 and the rotation frame unit 120 to allow the rotation frame unit 120 having a rotation movement.

The bearing 170 may be a ball-and-roller bearing, a journal bearing, or an air-foil bearing.

Hereinafter, an operation of the rotation assembly 100 according to an exemplary embodiment is described.

Electricity and communication signals are inputted to the rotation assembly 100 through the terminal unit 113 of the base unit 110. The electricity and communication signals inputted to the terminal unit 113 are transmitted to the first cable portion 161, the slip ring 150, the second cable portion 162, and the control substrate 122.

The control substrate 122 drives the rotation motor 132 of the rotation driving unit 130 according to pre-inputted program or communication signals.

When the rotation motor 132 is driven, the driving gear 131 is rotated by the speed reducing device 133. The driving gear 131 is disposed to be engaged with the main gear 112, and accordingly, the rotation frame unit 120 rotates with respect to the rotation axis S2 by as much as the rotation of the driving gear 131.

That is, since the main gear 112 is fixed, the driving gear 131 revolves around the main gear 112 while the driving gear 131 rotates, and since the rotation driving unit 130 having the driving gear 131 is fixed on the rotation frame unit 120, the rotation frame unit 120 rotates.

Variables of the rotation movements of the rotation frame unit 120, such as a rotation angle and a rotation angular speed, are measured by the encoder 140. Since the hollow axis 141 of the encoder 140 is fixedly installed on the base unit 110, the encoder main body 142 measures the rotation movement of the rotation frame unit 120 while the encoder main body 142 rotates. The control substrate 122 computes a rotation angle, a rotation angular speed, a rotation angular acceleration, etc. by receiving signals from the encoder main body 142. The computation results are used for feedback control of the rotation motor 132.

At this point, since the encoder main body 142 is fixedly installed on the encoder installation unit 123 of the rotation frame unit 120, the encoder 140 may correctly measure the rotation movement of the rotation frame unit 120. That is, since the rotation axis S2 of the rotation frame unit 120 is disposed to coincide with the central axis S1 of the hollow axis 141 of the encoder 140 and the rotation frame unit 120 rotates together with the encoder main body 142, the encoder 140 may correctly measure the rotation movement of the rotation frame unit 120.

Also, in the current exemplary embodiment, the twisting of the cable 160 may be effectively prevented while the rotation frame unit 120 rotates. This is because the encoder 140 includes the hollow axis 141, and an upper edge of the slip ring 150 is configured to be placed in the through hole 141a of the hollow axis 141. Also, the disposition structure of the hollow axis 141 and the slip ring 150 simplifies inner configuration of the rotation assembly 100. Accordingly, an assembling efficiency of the rotation assembly 100 may be increased and the inner space of the rotation assembly 100 may be effectively used, thereby reducing an overall volume of the rotation assembly 100.

As described above, according to the exemplary embodiment, since the hollow axis 141 is fixed on the base unit 110 and the rotation frame unit 120 rotates together with the encoder main body 142, the measurement of the rotation movement of the rotation frame unit 120 may be correctly performed. Therefore, through the feedback control described above, the rotation movement (rotation angle, etc.) of the rotation frame unit 120 may be controlled with a high precision.

Also, according to the current exemplary embodiment, it is configured such that a portion of the slip ring 150 is disposed in the through hole 141a of the hollow axis 141 of the encoder 140. Therefore, the total volume of the rotation assembly 100 is reduced, and the assembling efficiency is increased.

Figure 5:
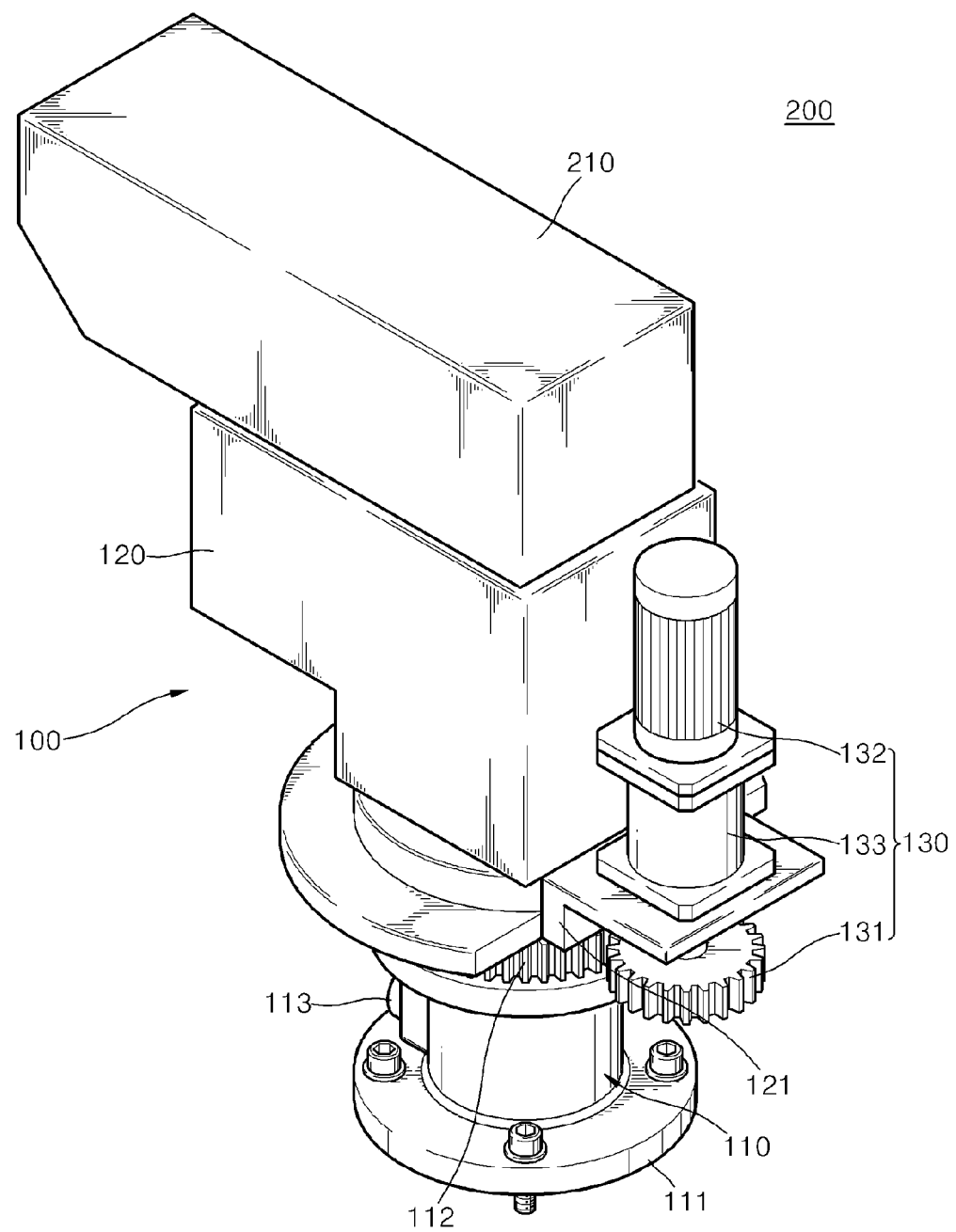
FIG. 5 is a schematic perspective view of a surveillance apparatus having the rotation assembly of FIG. 1.

FIG. 5 is a schematic perspective view of a surveillance apparatus 200 having the rotation assembly 100 of FIG. 1.

The surveillance apparatus 200 is configured to perform a panning movement by installing an imaging apparatus 210 (camera, etc.) on the rotation frame unit 120. The configuration, operation, and effectiveness of the rotation assembly 100 described above may be applied to the surveillance apparatus 200. In particular, as described above, the rotation movement of the rotation frame unit 120 may be precisely controlled, and thus, operations performed by the imaging apparatus 210, such as, an imaging operation and a surveillance operation with respect to an object to be watched may be correctly performed.

Although the surveillance apparatus 200 depicted in FIG. 5 does not include a configuration for tilting movement, the configuration for tilting movement may be included in the surveillance apparatus 200.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A rotation assembly comprising:
   a base unit;
   a rotation frame unit rotatably installed on the base unit;
   a rotation driving unit configured to drive the rotation frame unit to rotate;
   an encoder comprising:
     a hollow axis fixedly installed on the base unit; and
     an encoder main body fixedly installed on the rotation frame unit; and
   a slip ring installed on the base unit,
   wherein a portion of the slip ring or a portion of a cable connected to the slip ring is disposed in a through hole provided in the hollow axis,
   wherein the encoder main body is configured to rotate around the hollow axis with respect to a central axis of the hollow axis, and
   wherein the base unit comprises a main gear fixedly installed on the base unit, and
   wherein the rotation driving unit is installed on the rotation frame unit and comprises a driving gear engaging with the main gear.

2. The rotation assembly of claim 1, wherein the base unit further comprises a terminal unit electrically connected to an external circuit, and the terminal unit is electrically connected to an input unit of the slip ring.

3. The rotation assembly of claim 1, wherein the rotation frame unit comprises a control substrate, and the control substrate is electrically connected to an output unit of the slip ring.

4. The rotation assembly of claim 1, wherein the rotation driving unit comprises a rotation motor that rotates a driving gear in the rotating driving unit.

5. The rotation assembly of claim 1, wherein a central axis of the hollow axis coincides with a rotation axis of the rotation frame unit.

6. The rotation assembly of claim 5, wherein the rotation frame unit is configured to rotate if a driving gear thereof revolves around a main gear included in the base unit.

7. The rotation assembly of claim 6, wherein the rotation frame unit is configured to rotate with respect to the rotation axis in an equal rotation amount with a rotation of the driving gear around the main gear.

8. The rotation assembly of claim 1, wherein the encoder main body is fixedly installed on the rotation frame unit so that the rotation frame unit rotates along with the encoder main body when the rotation frame unit is driven by the rotation driving unit.

9. A surveillance apparatus comprising:
   the rotation assembly of claim 1; and
   an imaging apparatus installed on the rotation frame unit.

10. The surveillance apparatus of claim 9, wherein the base unit further comprises a terminal unit electrically connected to an external circuit, and the terminal unit is electrically connected to an input unit of the slip ring.

11. The surveillance apparatus of claim 9, wherein the rotation frame unit comprises the control substrate, and the control substrate is electrically connected to an output of the slip ring.

12. The surveillance apparatus of claim 9, wherein the rotation driving unit comprises a rotation motor that rotates a driving gear in the rotating driving unit.

13. The surveillance apparatus of claim 9, wherein a central axis of the hollow axis coincides with a rotation axis of the rotation frame unit.

14. The surveillance apparatus of claim 13, wherein the rotation frame unit is configured to rotate if the driving gear thereof revolves around the main gear included in the base unit.

15. The surveillance apparatus of claim 14, wherein the rotation frame unit is configured to rotate with respect to the rotation axis in an equal rotation amount with a rotation of the driving gear around the main gear.

16. The surveillance apparatus of claim 9, wherein the hollow axis is fixedly installed on the base unit and the encoder main body is fixedly installed on the rotation frame unit.

* * * * *